United States Patent
Umeno

(10) Patent No.: US 6,654,404 B1
(45) Date of Patent: Nov. 25, 2003

(54) SYSTEM, APPARATUS, AND METHOD FOR OUTPUTTING PSEUDORANDOM NOISE SEQUENCES, AND DATA RECORDING MEDIUM

(75) Inventor: Ken Umeno, c/o Communications Research Laboratory, Ministry of Posts and Telecommunications, 2-1, Nukuikitamachi 4 chome, Koganei-shi, Tokyo 184-8795 (JP)

(73) Assignee: Ken Umeno, Tokyo (JP)

(*) Notice: Subject to any disclaimer, the term of this patent is extended or adjusted under 35 U.S.C. 154(b) by 674 days.

(21) Appl. No.: 09/584,923

(22) Filed: May 31, 2000

(30) Foreign Application Priority Data

May 31, 1999 (JP) .......................................... 11-152063

(51) Int. Cl.$^7$ ............................................. H04B 1/707
(52) U.S. Cl. ....................... 375/130; 375/135; 708/250; 708/251; 708/252; 708/253; 708/256
(58) Field of Search ................. 375/130; 708/250–256; 331/78

(56) References Cited

U.S. PATENT DOCUMENTS 5,394,434 A * 2/1995 Kawabe et al. ............. 370/342
6,331,974 B1 * 12/2001 Yang et al. ................. 370/342

FOREIGN PATENT DOCUMENTS

WO  WO98/59458  * 12/1998  ............. H04L/9/00

OTHER PUBLICATIONS

Umeno, Kitayama, "Improvement of SNR with Chaotic Spreading Sequences for CDMA," 1999 IEEE ITW Proceedings, Kruger National Park, South Africa, Jun. 20–25.

Umeno, Kitayama, "Spreading Sequences Using Periodic Orbits of Chaos for CDMA," *Electronic Letters*, v.35, No. 7 (Apr. 1999).

* cited by examiner

Primary Examiner—Don N. Vo
Assistant Examiner—Qutub Ghulamali

(57) ABSTRACT

A system for outputting pseudorandom noise sequences comprises a plurality of output apparatuses. Each of the apparatuses comprise a natural number obtainer for obtaining a natural number p, a first transmission value calculator for calculating a value $Y=F(p,X)$, a first transmitter for transmitting the value Y to the other output apparatus, a receiver for receiving a value Y' transmitted by the other output apparatus, a second transmission value calculator for calculating a value $Y''=F(p,Y')$ if a function $F(p,\bullet)$ has not been applied to the value Y', a second transmitter for transmitting the value Y'' to the other output apparatus, an initial value calculator for calculating an initial value $Z'=F(p,Y')$ if the function $F(p,\bullet)$ has been applied to the value Y', a degree obtainer for obtaining a degree "r", and a sequence output unit for outputting a sequence $Z', T(r,Z'), T(r,T(r,Z')), T(r,T(r,T(r,Z'))), \ldots$ having the predetermined length by repeatedly applying Chebyshev map $T(r,\bullet)$ to the initial value Z'.

22 Claims, 4 Drawing Sheets

SYSTEM, APPARATUS, AND METHOD FOR OUTPUTTING PSEUDORANDOM NOISE SEQUENCES, AND DATA RECORDING MEDIUM

BACKGROUND OF THE INVENTION

1. Field of the Invention

The present invention relates to a system, an apparatus, and a method for outputting PN (Pseudorandom Noise) sequences, and a data recording medium, more particularly to a system, an apparatus, and a method suitable for outputting PN sequences as spreading sequences in CDMA (Code Division Multiple Access) for spread spectrum communication which is useful for satellite communication, cable communication, mobile communication such as cellular telephony and PHS (Personal Handy phone System), and ranging such as GPS (Global Positioning System), and a data recording medium.

2. Description of the Related Art

Spread spectrum communication technology such as CDMA has employed PN sequences as spreading sequences for secure communications and efficient sharing of limited radio frequency resources.

Conventionally, the maximum length code (M-sequence), Gold code, Kasami code, and the like have been utilized to generate the PN sequences. Those code systems usually calculate the PN sequences by using linear shift register circuits and an EXCLUSIVE-OR circuit. However, it is difficult to establish secure communications because the PN sequences based on the above code system are binary sequences which are cracked easily.

The spread spectrum communication requires synchronization between communication terminals. The trade-off for enhanced security is difficulty of synchronization of the PN sequences at the receivers.

Industry has demanded a new technique for outputting PN sequences which realize more enhanced security as compared to the conventional PN sequences. Chaos theory, which is one of growth studies, has been focused on as a theory which realize more enhanced secure CDMA communications by generating hard-to-detect PN sequences.

However, chaos based PN sequences requires a receiver to search a target sequence in a huge sequence space for code synchronization. Therefore, a simple code synchronization technique has been also demanded.

SUMMARY OF THE INVENTION

The present invention has been made in consideration of the above problems. It is an object of the present invention to provide a system, an apparatus, a method for outputting PN sequences, and a data recording medium, more particularly to a system, an apparatus, a method, and a data recording medium suitable for outputting PN sequences to be utilized as spreading sequences for spread spectrum communication.

To accomplish the above objects, the following present invention will now be disclosed in accordance with the principle of the present invention.

A system for outputting pseudorandom noise sequences, based on preset elliptic function s($\bullet$), a real number X (where $-1<X<1$), a rational map F($\bullet,\bullet$) defined by the following equation 1, and a Chebyshev map T($\bullet,\bullet$) defined by the following equation 2, comprises first and second output apparatuses each having a natural number obtainer, a transmission value calculator, a transmitter, a receiver, a degree obtainer, an initial value calculator, and a sequence output unit.

In the first output apparatus, the natural number obtainer obtains a natural number p, the transmission value calculator calculates a value $Y=F(p,X)$, and the transmitter transmits the value Y to the second output apparatus.

In the second output apparatus, the natural number obtainer obtains a natural number q, the receiver receives the value Y transmitted by the transmitter in the first output apparatus, the initial value calculator calculates an initial value $Z=F(q,Y)$, the degree obtainer obtains a degree "s", the sequence output unit in the second output apparatus repeatedly applies the Chebyshev map $T(s,\bullet)$ to the initial value Z, and outputs the following pseudorandom noise sequence having the predetermined length:
Z, T(s,Z), T(s,T(r,Z)), T(s,T(s,T(s,Z))), . . .

the transmission value calculator calculates a value $Y'=F(q,X)$, and the transmitter transmits the value Y' to the first output apparatus.

In the first output apparatus, the receiver receives the value Y' transmitted by the transmitter in the second output apparatus, the initial value calculator calculates an initial value $Z'=F(p,Y')$, the degree obtainer obtains a degree "r", and the sequence output unit repeatedly applies the Chebyshev map $T(r,\bullet)$ to the initial value Z', and outputs the following pseudorandom noise sequence having the predetermined length:
Z', T(r,Z'), T(r,T(r,Z')), T(r,T(r,T(r,Z'))), . . .

$$F(n, s(x)) = s(nx) \quad \left(\begin{array}{l}n \text{ is a natural number equal} \\ \text{to or greater than 2}\end{array}\right) \quad \text{Equation 1}$$

$$T(n, \cos x) = \cos nx \quad \left(\begin{array}{l}n \text{ is a natural number equal} \\ \text{to or greater than 2}\end{array}\right) \quad \text{Equation 2}$$

The degree obtainers in the first and second output apparatuses may obtain prime numbers as the degrees.

An apparatus according to present invention outputs pseudorandom noise sequences based on preset elliptic function s($\bullet$), a real number X (where $-1<X<1$), a rational map F($\bullet,\bullet$) defined by the following equation 1, and a Chebyshev map T($\bullet,\bullet$) defined by the following equation 2.

The apparatus comprises:

a natural number obtainer which obtains a natural number p;

a transmission value calculator which calculates a value $Y=F(p,X)$;

a transmitter which transmits the value Y to another output apparatus, a receiver which receives a value Y' transmitted by another output apparatus, an initial value calculator which calculates an initial value $Z'=F(p,Y')$, a degree obtainer which obtains a degree "r", a sequence output unit which repeatedly applies the Chebyshev map $T(r,\bullet)$ to the initial value Z', and outputs the following pseudorandom noise sequence having the predetermined length;

Z', $T(r,Z')$, $T(r,T(r,Z'))$, $T(r,T(r,T(r,Z')))$, . . .

The degree obtainers in the first and second output apparatuses may obtain prime numbers as the degrees.

A system according to the present invention outputs pseudorandom noise sequences, based on a preset elliptic function $s(\bullet)$, a real number X (where $-1<X<1$), a rational map $F(\bullet,\bullet)$ defined by the following equation 1, and a Chebyshev map $T(\bullet,\bullet)$ defined by the following equation 2, and comprises a plurality of output apparatuses.

Each of the output apparatuses comprises:

a natural number obtainer which obtains a natural number p;

a first transmission value calculator which calculates a value $Y=F(p,X)$;

a transmitter which transmits the value Y to the other output apparatus;

a receiver which receives a value Y' transmitted by the other apparatus;

a second transmission value calculator which calculates a value $Y''=F(p,Y')$ when a function $F(p,\bullet)$ has not been applied to the value Y';

a second transmitter which transmits the value Y" to the other output apparatus;

an initial value calculator which calculates an initial value $Z'=F(p,Y')$ when the function $F(p,\bullet)$ has been applied to the value Y';

a degree obtainer which obtains a degree "r":

a sequence output unit which repeatedly applies the Chebyshev map $T(r,\bullet)$ to the initial value Z•, and outputs the following pseudorandom noise sequence having the predetermined length:

Z', $T(rZ')$, $T(r,T(r,Z'))$, $T(r,T(r,T(r,Z')))$, . . .

The degree obtainer in each of the output apparatuses may obtain a prime number as the degree.

The output system may be divided into a plurality of groups, and same real numbers may be input to the transmission value calculators in the output apparatuses in the same group.

An apparatus according to the present invention outputs pseudorandom noise sequences, based on preset elliptic function $s(\bullet)$, a real number X (where $-1<X<1$), a rational map $F(\bullet,\bullet)$ defined by the following equation 1, and a Chebyshev map $T(\bullet,\bullet)$ defined by the following equation 2.

The output apparatus comprises:

a natural number obtainer which obtains a natural number p;

a transmission value calculator which calculates a value $Y=F(p,X)$;

a transmitter which transmits the value Y' to another output apparatus, a receiver which receives a value Y' transmitted by another output apparatus, an initial value calculator which calculates an initial value $Z'=F(p,Y')$, a degree obtainer which obtains a degree "r", a sequence output unit which repeatedly applies the Chebyshev map $T(\bullet, \bullet)$ to the value Z', and outputs the following pseudorandom noise sequence having the etermined length:

Z', $T(r,Z')$, $T(r,T(r,Z'))$, $T(r,T(r,T(r,Z')))$, . . .

The degree obtainer may obtain a prime number as the degree.

A method according to the present invention outputs pseudorandom noise sequences based on a preset elliptic function $s(\bullet)$, a real number X (where $-1<X<1$), a rational map $F(\bullet,\bullet)$ defined by the following equation 1, and a Chebyshev map $T(\bullet,\bullet)$ defined by the lowing equation 2.

The method comprises:

obtaining a natural number p;

calculating a value $Y=F(p,X)$;

transmitting the value Y;

receiving a value Y';

calculating an initial value $Z'=F(p,Y')$;

obtaining a degree "r"; and repeatedly applying a Chebyshev map $T(\bullet,\bullet)$ to the initial value Z', and outputting the following pseudorandom noise sequence having the predetermined length:

Z', $T(r,Z')$, $T(r,T(r,Z'))$, $T(r,T(r,T(r,Z')))$, . . .

The obtaining the degree may obtain a prime number as the degree.

A method according to the present invention outputs pseudorandom noise sequences based on a preset elliptic function $s(\bullet)$, a real number X (where $-1<X<1$), a rational map $F(\bullet,\bullet)$ defined by the following equation 1, and a Chebyshev map $T(\bullet,\bullet)$ defined by the following equation.

The method comprises:

obtaining a natural number p;

calculating a value $Y=F(p,X)$ based on the obtained natural number p;

transmitting the value Y;

receiving a value Y';

calculating a value $Y''=F(p,Y')$ when a function $F(p,\bullet)$ has not been applied to the value Y';

transmits the value Y";

calculating an initial value $Z'=F(p,Y')$ when the function $F(p,\bullet)$ has been applied to the value Y';

obtaining a degree "r":

repeatedly applying the Chebyshev map $T(r,\bullet)$ to the initial value Z', and outputting the following pseudorandom noise sequence having the predetermined length:

Z', $T(r,Z')$, $T(r,T(r,Z'))$, $T(r,T(r,T(r,Z')))$, . . .

The obtaining the degree may obtain a prime number as the degree.

A program which realizes the system, the apparatus, and the method for outputting the pseudorandom noise sequences may be stored in a data recording medium such as a compact disc, a floppy disk, a hard disk, a magneto-optical disk, a digital versatile disc, a magnetic tape, and a semiconductor memory.

Executing the program stored in the data recording medium according to the present invention by a data processor such as a general purpose computer or a parallel computer which comprises a storage device, a calculator, an output device, and the like realizes the system, the apparatus, and the method for outputting the pseudorandom noise sequences.

The data recording medium storing the program according to the present invention may be distributed or merchandized as a single product independent from the data processor.

BRIEF DESCRHIPION OF THE DRAWINGS

These objects and other objects and advantages of the present invention will become more apparent upon reading of the following detailed description and the accompanying drawings in which.

DETAILED DESCRIPTION OF THE PREFERRED EMBODIMENTS

Embodiments of the present invention will now be described. One skilled in the art may be able to propose modified embodiments each of which include all or some elements described in the following embodiments of the present invention. Such the modified embodiments will be included in the scope of the present invention, because the following embodiments of the present invention do not limit the scope of the present invention but just explain the present invention.

First Embodiment

Figure 1:
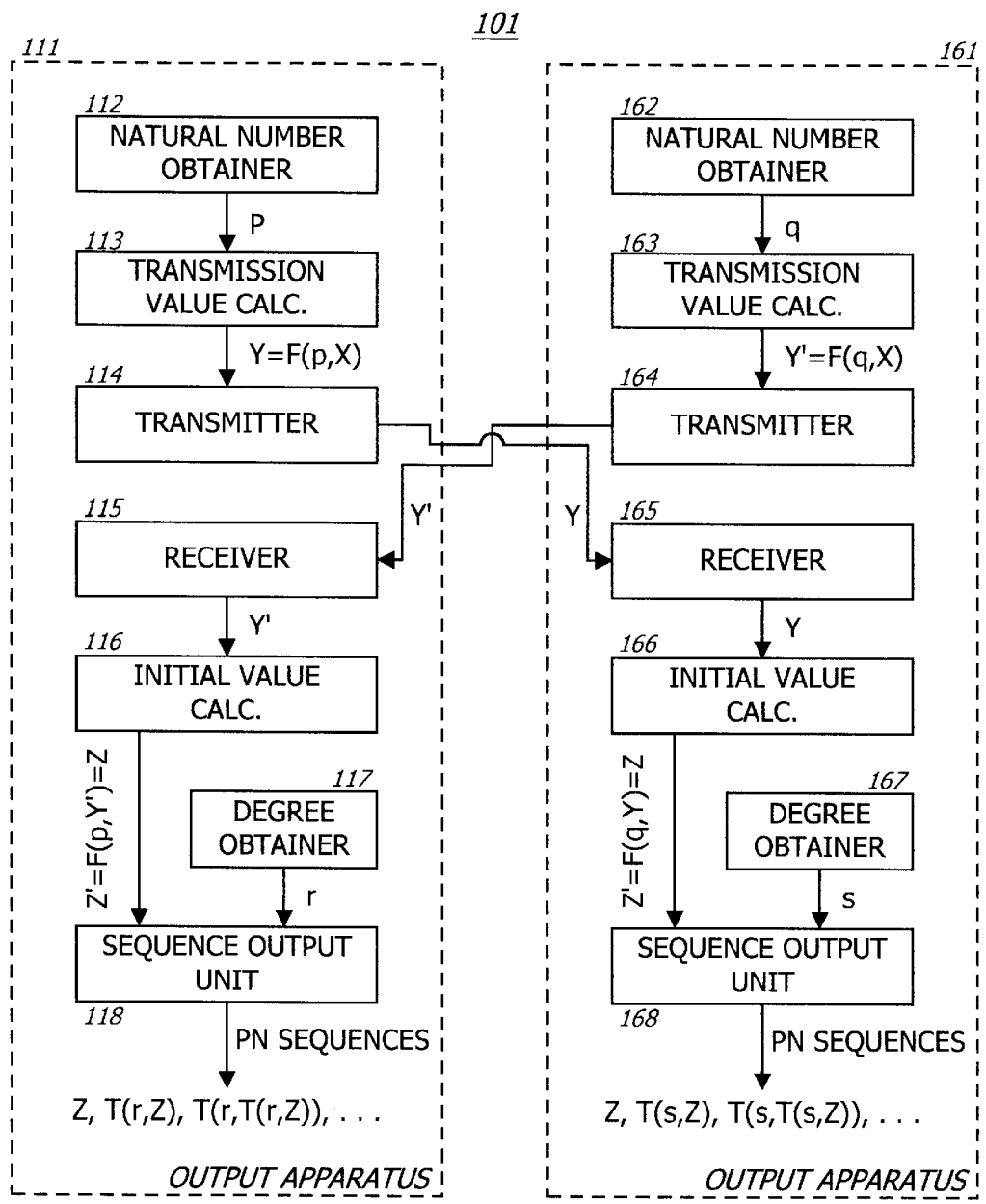
FIG. 1 is a diagram schematically showing the structure of a PN sequence output system according to a first embodiment of the present invention.

FIG. 1 is a diagram (flowchart) schematically showing a PN sequence output system according to the present invention. FIG. 1 is both a block diagram and a flowchart showing data flow along arrows. The first embodiment will now be described with reference to FIG. 1.

An output system 101 comprises output apparatuses 111 and 161.

The output apparatus 111 comprises a natural number obtainer 112, a transmission value calculator 113, a transmitter 114, a receiver 115, an initial value calculator 116, a degree obtainer 117, and sequence output unit 118.

The output apparatus 161 comprises a natural number obtainer 162, a transmission value calculator 163, a transmitter 164, a receiver 165, an initial value calculator 166, a degree obtainer 167, and a sequence output unit 168.

The natural number obtainers 112 and 162 in the output apparatuses 111 and 161 obtains relatively large natural numbers "p" and "q" respectively. Those natural numbers will act as private keys.

The output apparatuses 111 and 161 share given elliptic function s(•) and real value public key X (−1<X<1) having guaranteed accuracy. Even if the shared elliptic function s(•) and public key X are intercepted, secure communication is maintained (details will be described later).

The transmission value calculator 113 utilizes the natural number "p" obtained by the natural number obtainer 112 to calculate Y=F(p,x), while the transmission calculator 163 in the output apparatuses 161 utilizes the natural number "q" obtained by the natural number obtainer 162 to calculate Y'=F(q,X).

A map F(•,•) is a rational map defined by the elliptic function, which is expressed directly by a rational polynomial. That is, the transmission value calculators 113 and 163 may be realized by a simple structure such as a calculation circuit with a memory or a CPU (Central Processing Unit) for a computer with a memory.

The transmitter 114 in the output apparatus 111 transmits the value Y to the receiver 165 in the output apparatus 161, while the transmitter 164 in the output apparatus 161 transmits the value Y' to the receiver 115 in the output apparatus 111. Even if the values Y and Y' are intercepted, secure communication is maintained (details will be described later).

The initial value calculator 116 in the output apparatus 111 utilizes the value Y' received by the receiver 115 to calculate an initial value Z'=F(p,Y'), while the initial value calculator 166 in the output apparatus 161 utilizes the value Y received by the receiver 165 to calculate an initial value Z=F(q,Y).

Since the rational map F(•,•) is defined by an addition theorem of the elliptic function s(•), the following relationship is established:

Z'=F(p,Y')=F(p,F(q,X))=F(q,F(p,X))=F(q,Y)=Z'

Accordingly, the output apparatuses 111 and 161 share the initial values for spreading sequences in CDMA.

The degree obtainers 117 and 167 in the output apparatuses 111 and 161 obtain a degree "r" and a degree "s" respectively. It is preferable that each degree is a natural number equal to or greater than 2 while being a prime number.

The sequence output unit 118 in the output apparatus 111 outputs the following PN sequence having the predetermined length:

Z, T(r,Z), T(r,T(r,Z)), T(r,T(r,T(r,Z))), ...

which is obtained by applying a Chebyshev map T(r,•) to the value Z=Z' repeatedly, while the sequence output unit 168 in the output apparatus 161 outputs the following PN sequence having the predetermined length:

Z, T(s,Z), T(s,T(s,Z)), T(s,T(s,T(s,Z))), ...

which is obtained by applying a Chebyshev map T(s,•) to the value Z=Z'repeatedly. Those PN sequences can be output by repeated calculation of a recurrence formula.

Figure 2:
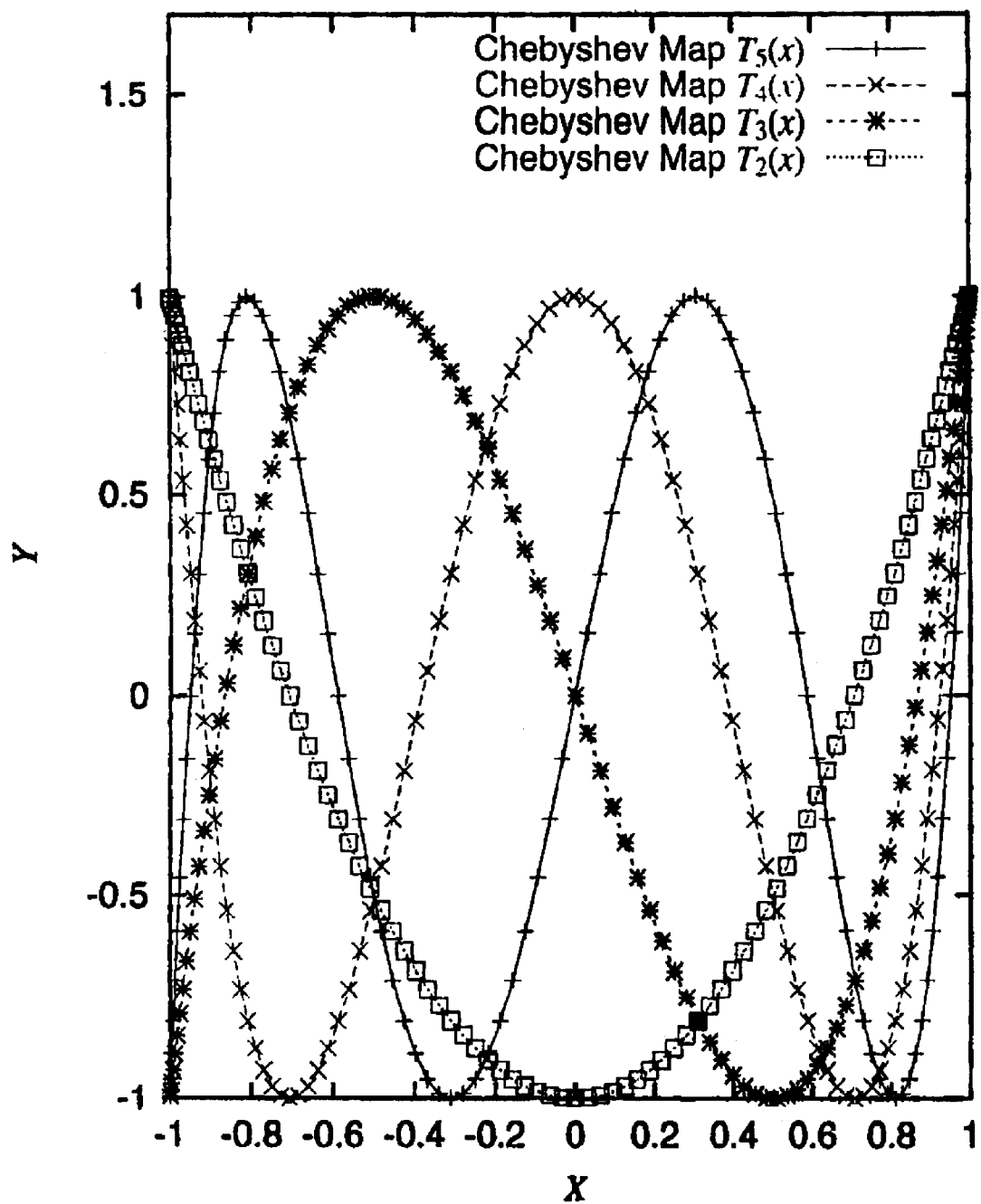
FIG. 2 is a graph showing Chebyshev maps.

FIG. 2 shows Chebyshev maps. FIG. 2 is a graph showing Chebyshev maps T(2,•), T(3, •), T(4, •), and T(5, •) whose degrees are 2 to 5 respectively. Each Chebyshev map is a rational onto mapping of the interval [−1,1]. The Chebyshev map is defined by an addition theorem of a cosine function, which can be expressed directly by a rational polynomial. The following equations 3 is a rational polynomial expressing the Chebyshev map where the degree is 2, and equation 4 expresses the same where the degree is 3.

$$T(2, y) = 2y^2 - 1 \qquad \text{Equation 3}$$

$$T(3, y) = 4y^3 - 3y \qquad \text{Equation 4}$$

Accordingly, the sequence output units 118 and 168 may be realized by a simple structure such as a calculator circuit with a memory or a CPU for a computer with a memory.

The examiner et al. have proved that thus obtained PN sequences show better correlation properties for CDMA as compared to the conventional maximum length code (the M-sequence), the Gold code, and the Kasami code, based on the fact that correlation properties of the above PN sequences are almost orthogonal in a case where CDMA employs the above PN sequences as spreading sequences (K. Umeno and K. Kitayama, Electronics Letters (1999) vol. 35, pp. 545–546; K. Umeno and K. Kitayama, Proc. 1999 IEEE Information Theory and Communications Workshop, p.106).

Then, spread spectrum communication using the above PN sequences between a communication apparatus (not shown) comprising the output apparatus 111 and another communication apparatus (not shown) comprising the output apparatus 161 is established.

The two communication apparatuses each having the output apparatuses 111 and 161 receive signals in which spectrums are spread by the PN sequences respectively. CDMA synchronization is required for the reception. In this case, since differences between the PN sequences are just degrees of the Chebyshev maps, search space for the synchronization is reduced. Moreover, since correlation function between every pair of two different spreading sequences generated by the Chebyshev polynomials is zero, easy synchronization is realized just by carrying out correlation detection.

Even if the elliptic function s(•), public key X, value Y, and value Y' are intercepted, it is very difficult for the eavesdropper to find out the initial value Z=Z' in the PN sequences and the PN sequences themselves as well the as Diffie-Hellman problem which is known as computationally hard problem (N. Koblitz, "A course in Number Theory and Cryptography" (translated by Koichi Sakurai), Springer-Verlag Tokyo, Inc., 1997).

Thus, the chaos based spreading sequences realize more secure communication as compared to the conventional spreading sequences for CDMA, while being compatible with easy synchronization.

If the public key X is a rational number, the initial values are also rational numbers. Therefore, the initial values calculated by the output apparatuses 111 and 161 are coincided with each other strictly (Z=Z'). Even if the public key X is a floating point number decimal, the initial values are also coincided with each other up to the predetermined floating point accuracy. In those cases, the values from the public key X to the shared initial values (Z=Z') are digitally processed, Each of the output apparatuses 111 and 161 may be divided into two sections, a communication section (the transmitter 114/164, and the receiver 115/165) and another section.

The another section may comprise a calculator circuit, that is, the section may employ a single chip structure. Or, a computer having a CPU and a memory may act as this section. One skilled in the art may realize those structures easily, and the scope of the invention includes them.

Second Embodiment

The above described first embodiment featured the system for one-to-one spectrum spread communication with chaos based spreading sequence. A second embodiment features a system suitable for the spread spectrum communication among three or more users.

Figure 3:
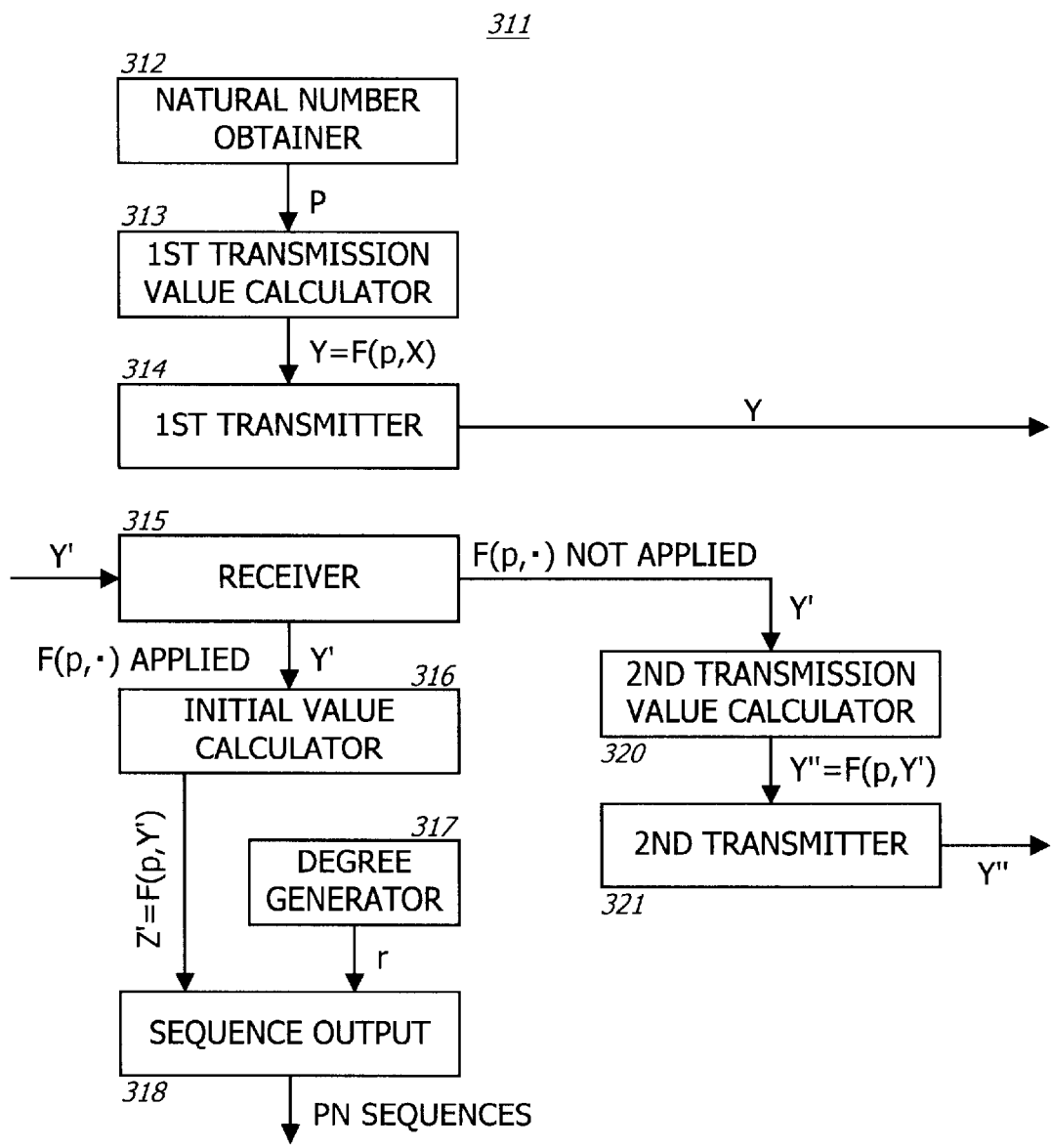
FIG. 3 is a diagram schematically showing the structure of a PN sequence output system according to a second embodiment of the present invention.

FIG. 3 is a diagram (flowchart) schematically showing an output apparatus in an output system according to this embodiment. FIG. 3 is both a block diagram and a flowchart showing data flow along arrows.

An output apparatus 311 according to this embodiment comprises a natural number obtainer 312, a first transmission value calculator 313, a first transmitter 314, a receiver 315, an initial value calculator 316, a degree obtainer 317, a sequence output unit 318, a second transmission value calculator 320, a second transmitter 321.

The natural number obtainer 312 in the output apparatus 311 obtains relatively large natural number "p". The natural number will act as a private key.

The output apparatuses 311 communicating with each other in the system share given elliptic function s(•) and real value public key X (−1<X<1) having guaranteed accuracy.

The first transmission value calculator 313 utilizes the natural value "p" obtained by the natural number obtainer 312 to calculate Y=F(p,x).

The transmitter 314 in one output apparatus 311 transmits the value Y to a receiver 315 in another output apparatus 311.

When the receiver 315 receives the value Y' from the other output apparatus 311, it is discriminated whether the output apparatus 311 has already applied its own map F(p, •) and the other output apparatuses 311 have done the same.

If the map applications have not done yet, the second transmission value calculator 320 calculates a value Y"=F(p,Y'), and the second transmitter 321 transmits the value Y" to the other output apparatuses 311. In this case, the first transmitter 314 and the second transmitter 321 may be the same hardware component.

On the contrary, if the map applications have already been done, the initial value calculator 316 in the output apparatus 311 calculates an initial value Z'=F(p,Y').

The discrimination whether the map applications have been done or not may be realized by detecting information indicating which apparatus(s) has done the map application, which is affixed to the values Y and Y" being transmitted.

Figure 4:
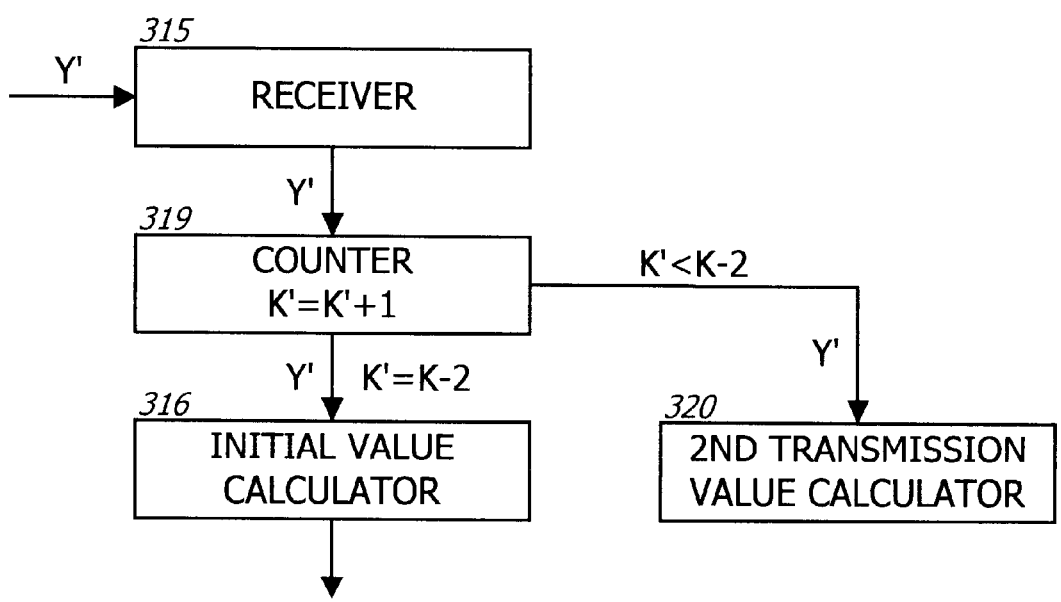
FIG. 4 is a diagram schematically showing the structure of additional components in the PN sequence output system according to the second embodiment of the present invention.

In a case where the number of users is K (K≦3), a counter 319 shown in FIG. 4 is helpful for the discrimination. FIG. 4 is basically the same as FIG. 3 but just shows additional or different components. Like or the same components are denoted by the same reference numerals which are used in FIG. 3.

The counter 319 is initially reset to 0, then, is incremented one by one each time the receiver 315 receives the values from the other output apparatuses 311 (hereinafter K' denotes a count value of the counter 319).

A case of K'<K−2 represents that some of the other output apparatuses 311 have not done the map application. In this case, since the source of the value Y' is one of the other output apparatuses 311 (not its own transmitter 314), the second transmission value calculator 320 applies its own map F(p, •).

On the contrary, in a case where K'=K−2, the output apparatus 311 concerned has applied its own map, and the other output apparatuses 311 have also applied their own maps. In this case, the counter 319 is reset to 0, and the initial value calculator starts to calculate an initial value.

Since a rational map F(•,•) is defined by an addition theorem of a specific elliptic function s(•), all output apparatuses 311 have the same initial values Z' if all second transmission calculators 320 have done the map application.

This effect is proved by the following relationship in a case where the natural number obtainers in three output apparatuses 311 obtains natural numbers p, q, and t respectively for a communication among three users:

F(p,F(q,F(t,X)))=F(p,F(t,F(q,X)))=F(q,F(p,F(t,X)))=F(q, F(t,F(p,X)))=F(t,F(p,F(q,X)))=F(t,F(q,F(p,X)))

The same relationship appears in a communication among four or more users.

Thus, the multiple output apparatuses 311 communicating with each other share the initial values for spreading sequences in CDMA. This initial value (private key) sharing process may be applicable to any communication method such as not only the standard digital radio communication but also digital communication via optical-fiber cables or the like.

The degree obtainer 317 in the output apparatus 311 obtains a degree "r". It is preferable that the degree "r" is a natural number equal to or greater than 2, while being a prime number.

The sequence output unit 318 in the output apparatus 311 outputs the following PN sequence having the predetermined length:

Z', T(r,Z'), T(r,T(r,Z')), T(r,T(r,T(r,Z'))), . . .

which is obtained by applying a Chebyshev map T(r,•) to the value Z' repeatedly.

Then, communication apparatuses (not shown) each having the output apparatus 311 performs spread spectrum communication with each other in accordance with thus obtained PN sequences.

As well as the first embodiment, improved secure CDMA communication is realized while being compatible with easy synchronization.

Third Embodiment

A third embodiment is similar to the second embodiment, but features spread spectrum CDMA communication applicable to a communication among grouped users while the groups are not interfered by each other. The aforementioned initial value (private key) sharing is also helpful to this case.

In case of three groups which have three different public keys respectively, each group prepares its own initial value (private key) based on the preset public key, and the initial value is shared by the users in the group. The output apparatuses 311 of the users belonging to the group may employ different degrees for the calculation by the sequence output units 318. The same procedure is taken if the number of the groups increase or decrease.

In a Chebyshev map sequence generator, output PN sequences are always orthogonal to each other in the sense of correlation finction, regardless of a degree in the Chebyshev map generator if the output PN sequences have different initial values. Accordingly, spreading sequences of the different groups never coincide with each other accidentally even if the users of the different groups employ the PN sequences generated by the same Chebyshev map as CDMA spreading sequences.

Spreading sequences according to this embodiment realizes in-group communication while being separated from the other groups because of synchronization difficulty.

As described above, the present invention provides a system, an apparatus, and a method for outputting the PN sequences, and a data recording medium. The PN sequences realized by the present invention is especially suitable for CDMA spreading sequences for spread spectrum communication.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. H11-152063 filed on May 31, 1999 and including specification, claims, drawings and summary. The disclosure of the above Japanese Patent Application is incorporated herein by reference in its entirety.

What is claimed is:

1. A system for outputting pseudorandom noise sequences, based on preset elliptic function s(•), a real number X (where –1<X<1), a rational map F(•,•) defined by the following equation 5, and a Chebyshev map T(•,•) defined by the following equation 6, comprising first and second output apparatuses each having a natural number obtainer, a transmission value calculator, a transmitter, a receiver, a degree obtainer, an initial value calculator, and a sequence output unit, wherein said natural number obtainer in said first output apparatus obtains a natural number p, said transmission value calculator in said first output apparatus calculates a value Y=F(p,X), said transmitter in said first output apparatus transmits the value Y to said second output apparatus, said natural number obtainer in said second output apparatus obtains a natural number q, said receiver in said second output apparatus receives the value Y transmitted by said transmitter in said first output apparatus, said initial value calculator in said second output apparatus calculates an initial value Z=F(q,Y), said degree obtainer in said second output apparatus obtains a degree "s", said sequence output unit in said second output apparatus repeatedly applies the Chebyshev map T(s,•) to the initial value Z, and outputs the following pseudorandom noise sequence having the predetermined length: Z, T(s,Z), T(s,T(r,Z)), T(s,T(s,T(s,Z))), . . .

said transmission value calculator in said second output apparatus calculates a value Y'=F(q,X), said transmitter in said second output apparatus transmits the value Y' to said first output apparatus, said receiver in said first output apparatus receives the value Y' transmitted by said transmitter in said second output apparatus, said initial value calculator in said first output apparatus calculates an initial value Z'F(p,Y'), said degree obtainer in said first output apparatus obtains a degree "r", and said sequence output unit in said first output apparatus repeatedly applies the Chebyshev map T(r,•) to the initial value Z', and outputs the following pseudorandom noise sequence having the predetermined length: Z', T(r,Z'), T(r,T(r,Z')), T(r,T(r,T(r,Z'))), . . .

$$F(n, s(x)) = s(nx) \left( n \text{ is a natural number equal to or greater than } 2 \right) \quad \text{Equation 5}$$

$$T(n, \cos x) = \cos nx \left( n \text{ is a natural number equal to or greater than } 2 \right). \quad \text{Equation 6}$$

2. The system according to claim 1, wherein said degree obtainers in said first and second output apparatuses obtain prime numbers as the degrees.

3. An apparatus for outputting pseudorandom noise sequences, based on preset elliptic fuinction s(•), a real number X (where –1<X<1), a rational map F(•,•) defined by the following equation 7, and a Chebyshev map T(•,•) defined by the following equation 8, comprising:

a natural number obtainer which obtains a natural number p;

a transmission value calculator which calculates a value Y=Fp,X);

a transmitter which transmits the value Y to another output apparatus, a receiver which receives a value Y' transmitted by another output apparatus, an initial value calculator which calculates an initial value Z'=F(p,Y'), a degree obtainer which obtains a degree "r", a sequence output unit which repeatedly applies the Chebyshev map T(r,•) to the initial value Z', and outputs the following pseudorandom noise sequence having the predetermined length:

Z', T(r,Z'), T(r,T(r,Z')), T(r,T(r,T(r,Z'))), . . .

$$F(n, s(x)) = s(nx) \left( \begin{array}{c} n \text{ is a natural number equal} \\ \text{to or greater than 2} \end{array} \right) \quad \text{Equation 7}$$

$$T(n, \cos x) = \cos nx \left( \begin{array}{c} n \text{ is a natural number equal} \\ \text{to or greater than 2} \end{array} \right). \quad \text{Equation 8}$$

4. The apparatus according to claim 3, wherein said degree obtainer obtains a prime number as the degree.

5. A system for outputting pseudorandom noise sequences, based on a preset elliptic function s(•), a real number X (where −1<X<1), a rational map F(•,•) defined by the following equation 9, and a Chebyshev map T(•,•) defined by the following equation 10, comprising a plurality of output apparatuses, wherein each of said output apparatuses comprises:
a natural number obtainer which obtains a natural number p;
a first transmission value calculator which calculates a value Y=F(p,X);
a transmitter which transmits the value Y to the other output apparatus;
a receiver which receives a value Y' transmitted by the other apparatus;
a second transmission value calculator which calculates a value Y"=F(p,Y') when a function F(p,) has not been applied to the value Y';
a second transmitter which transmits the value Y" to the other output apparatus;
an initial value calculator which calculates an initial value Z'=F(p,Y') when the function F(p,•) has been applied to the value Y';
a degree obtainer which obtains a degree "r":
a sequence output unit which repeatedly applies the Chebyshev map T(r,•) to the initial value Z', and outputs the following pseudorandom noise sequence having the predetermined length:
Z', T(r,Z'), T(r,T(r,Z')), T(r,T(r,T(r,Z'))), . . .

$$F(n, s(x)) = s(nx) \left( \begin{array}{c} n \text{ is a natural number equal} \\ \text{to or greater than 2} \end{array} \right) \quad \text{Equation 9}$$

$$T(n, \cos x) = \cos nx \left( \begin{array}{c} n \text{ is a natural number equal} \\ \text{to or greater than 2} \end{array} \right). \quad \text{Equation 10}$$

6. The system according to claim 5, wherein said degree obtainer in each of said output apparatuses obtains a prime number as the degree.

7. The system according to claim 5, wherein said output system is divided into a plurality of groups, and same real numbers are input to said transmission value calculators in said output apparatuses in the same group.

8. The system according to claim 6, wherein said output system is divided into a plurality of groups, and same real numbers are input to said transmission value calculators in said output apparatuses in the same group.

9. An apparatus for outputting pseudorandom noise sequences, based on a preset elliptic function s(•), a real number X (where −1<X<1), a rational map F(•,•) defined by the following equation 11, and a Chebyshev map T(•,•) defined by the following equation 12, comprising:

a natural number obtainer which obtains a natural number p;
a first transmission value calculator which calculates a value Y=F(p,X) based on the natural number p;
a transmitter which transmits the value Y to the other output apparatus;
a receiver which receives a value Y' transmitted by the other apparatus;
a second transmission value calculator which calculates a value Y"=F(p,Y') when a function F(p,•) has not been applied to the value Y';
a second transmitter which transmits the value Y" to the other output apparatus;
an initial value calculator which calculates an initial value Z'=F(p,Y') when the function F(p,•) has been applied to the value Y';
a degree obtainer which obtains a degree "r":
a sequence output unit which repeatedly applies the Chebyshev map T(r,•) to the initial value Z', and outputs the following pseudorandom noise sequence having the predetermined length:
Z', T(r,Z'), T(r,T(r,Z')), T(r,T(r,T(r,Z'))), . . .

$$F(n, s(x)) = s(nx) \left( \begin{array}{c} n \text{ is a natural number equal} \\ \text{to or greater than 2} \end{array} \right) \quad \text{Equation 11}$$

$$T(n, \cos x) = \cos nx \left( \begin{array}{c} n \text{ is a natural number equal} \\ \text{to or greater than 2} \end{array} \right). \quad \text{Equation 12}$$

10. The apparatus according to claim 9, wherein said degree obtainer in said output apparatus obtains a prime number as the degree.

11. A method of outputting pseudorandom noise sequences based on a preset elliptic finction s(•), a real number X (where −1<X<1), a rational map F(•,•) defined by the following equation 13, and a Chebyshev map T(•,•) defined by the following equation 14, comprising:

obtaining a natural number p;
calculating a value Y=F(p,X);
transmitting the value Y;
receiving a value Y';
calculating an initial value Z'=F(p,Y');
obtaining a degree "r"; and
repeatedly applying a Chebyshev map T(r,•) to the initial value Z', and outputting the following pseudorandom noise sequence having the predetermined length:
Z', T(r,Z'), T(r,T(r,Z')), T(r,T(r,T(r,Z'))), . . .

$$F(n, s(x)) = s(nx) \left( \begin{array}{c} n \text{ is a natural number equal} \\ \text{to or greater than 2} \end{array} \right) \quad \text{Equation 13}$$

$$T(n, \cos x) = \cos nx \left( \begin{array}{c} n \text{ is a natural number equal} \\ \text{to or greater than } 2 \end{array} \right). \quad \text{Equation 14}$$

12. The method according to claim 11, wherein said obtaining the degree obtains a prime number as the degree.

13. A method for outputting pseudorandom noise sequences based on a preset elliptic function s(•), a real number X (where −1<X<1), a rational map F(•,•) defined by the following equation 15, and a Chebyshev map T(•,•) defined by the following equation 16, comprising:

obtaining a natural number p;

calculating a value Y=F(p,X) based on the obtained natural number p;

transmitting the value Y;

receiving a value Y';

calculating a value Y"=F(p,Y') when a function F(p,•) has not been applied to the value Y';

transmits the value Y";

calculating an initial value Z'=F(p,Y') when the function F(p,•) has been applied to the value Y';

obtaining a degree "r":

repeatedly applying the Chebyshev map T(r,•) to the initial value Z', and outputting the following pseudorandom noise sequence having the predetermined length:

Z', T(r,Z'), T(r,T(r,Z')), T(r,T(r,T(r,Z'))), . . .

$$F(n, s(x)) = s(nx) \left( \begin{array}{c} n \text{ is a natural number equal} \\ \text{to or greater than } 2 \end{array} \right) \quad \text{Equation 15}$$

$$T(n, \cos x) = \cos nx \left( \begin{array}{c} n \text{ is a natural number equal} \\ \text{to or greater than } 2 \end{array} \right). \quad \text{Equation 16}$$

14. The method according to claim 13, wherein said obtaining the degree obtains a prime number as the degree.

15. A computer readable data recording medium storing a program which realizes put of pseudorandom noise sequences based on a preset elliptic function s(•), a real number X (where −1<X<1), a rational map F(•,•) defined by the following equation 17, and a Chebyshev map T(•,•) defined by the following equation 18, wherein the program realizes the steps of:

obtaining a natural number p;

calculating a value Y=F(p,X);

transmitting the value Y;

receiving a value Y';

calculating an initial value Z'=F(p,Y');

obtaining a degree "r"; and repeatedly applying a Chebyshev map T(r,•) to the initial value Z', and outputting the following pseudorandom noise sequence having the predetermined length:

Z', T(r,Z'), T(r,T(r,Z')), T(r,T(r,T(r,Z'))), . . .

$$F(n, s(x)) = s(nx) \left( \begin{array}{c} n \text{ is a natural number equal} \\ \text{to or greater than } 2 \end{array} \right) \quad \text{Equation 17}$$

$$T(n, \cos x) = \cos nx \left( \begin{array}{c} n \text{ is a natural number equal} \\ \text{to or greater than } 2 \end{array} \right). \quad \text{Equation 18}$$

16. The data recording medium according to claim 15, wherein said degree obtainig step obtains a prime number as the degree.

17. The data recording medium according to claim 16, wherein said data recording medium is a compact disc, a floppy disk, a hard disk, an magneto-optical disk, a digital versatile disc, a magnetic tape, or a semiconductor memory.

18. The data recording medium according to claim 15, wherein said data recording medium is a compact disc, a floppy disk, a hard disk, an magneto-optical disk, a digital, versatile disc, a magnetic tape, or a semiconductor memory.

19. A computer readable data recording medium storing a program which realizes output of pseudorandom noise sequences based on a preset elliptic function s(•), a real number X (where −1<X<1), a rational map F(•,•) defined by the following equation 19, and a Chebyshev map T(•,•) defined by the following equation 20, wherein the program realizes the steps of:

obtaining a natural number p;

calculating a value Y=F(p,X) based on the obtained natural number p;

transmitting the value Y;

receiving a value Y';

calculating a value Y"=F(p,Y') when a function F(p,•) has not been applied to the value Y';

transmits the value Y"; calculating an initial value Z'=F(p,Y') when the function F(p,•) has been applied the value Y';

obtaining a degree "r":

repeatedly applying the Chebyshev map T(r,•) to the initial value Z', and outputting the following pseudorandom noise sequence having the predetermined length:

Z', T(r,Z'), T(r,T(r,Z')), T(r,T(r,T(r,Z'))), . . .

$$F(n, s(x)) = s(nx) \left( \begin{array}{c} n \text{ is a natural number equal} \\ \text{to or greater than } 2 \end{array} \right) \quad \text{Equation 19}$$

$$T(n, \cos x) = \cos nx \left( \begin{array}{c} n \text{ is a natural number equal} \\ \text{to or greater than } 2 \end{array} \right). \quad \text{Equation 20}$$

20. The data recording medium according to claim 19, wherein said degree obtaining step obtains a prime number as the degree.

21. The data recording medium according to claim 19, wherein said data recording medium is a compact disc, a floppy disk, a hard disk, an magneto-optical disk, a digital versatile disc, a magnetic tape, or a semiconductor memory.

22. The data recording medium according to claim 20, wherein said data recording medium is a compact disc, a floppy disk, a hard disk, an magneto-optical disk, a digital versatile disc, a magnetic tape, or a semiconductor memory.

* * * * *

UNITED STATES PATENT AND TRADEMARK OFFICE
CERTIFICATE OF CORRECTION

PATENT NO. : 6,654,404 B1
DATED : November 25, 2003
INVENTOR(S) : Ken Umeno

It is certified that error appears in the above-identified patent and that said Letters Patent is hereby corrected as shown below:

Title page,
Item [73], Assignee, please insert the following before "Ken Umeno":
-- Communications Research Laboratory, Ministry of Posts and Telecommunications (JP); --.

Signed and Sealed this

Thirteenth Day of September, 2005

JON W. DUDAS
*Director of the United States Patent and Trademark Office*